United States Patent
Shepherd et al.

(10) Patent No.: US 6,683,599 B2
(45) Date of Patent: Jan. 27, 2004

(54) KEYPADS STYLE INPUT DEVICE FOR ELECTRICAL DEVICE

(75) Inventors: Robert A. Shepherd, Tarzana, CA (US); Nikolaj Helberg Bestle, Calabasas, CA (US)

(73) Assignee: Nokia Mobile Phones Ltd., Espoo (FI)

( * ) Notice: Subject to any disclaimer, the term of this patent is extended or adjusted under 35 U.S.C. 154(b) by 258 days.

(21) Appl. No.: 09/896,271

(22) Filed: Jun. 29, 2001

(65) Prior Publication Data

US 2003/0001821 A1 Jan. 2, 2003

(51) Int. Cl.⁷ .................................................. G09G 5/00

(52) U.S. Cl. ...................................................... 345/168

(58) Field of Search ................................ 345/168, 169, 345/171, 172, 156, 173; 178/18.01, 18.02, 18.03

(56) References Cited

U.S. PATENT DOCUMENTS

| | | | |
|---|---|---|---|
| 5,543,818 A | 8/1996 | Scott | |
| 5,808,567 A | 9/1998 | McCloud | |
| 5,818,437 A | * 10/1998 | Grover et al. | 345/811 |
| 2002/0126097 A1 | * 9/2002 | Savolainen | 345/168 |
| 2002/0136372 A1 | * 9/2002 | Bozorgui-Nesbat | 379/93.18 |

* cited by examiner

*Primary Examiner*—Richard Hjerpe
*Assistant Examiner*—Ronald Laneau
(74) *Attorney, Agent, or Firm*—Jubin Dana; Steven A. Shaw

(57) ABSTRACT

A mobile telephone includes a body, a display, and a keypad. The keypad is removably secured to the body and coupled to a processor. The keypad is depressible along a plurality of directions and can be switched between a first mode and second mode, wherein each combination of depressible direction and mode represent a unique group of alphanumeric letters. The processor includes word recognition software, such a desire word can be determined form the sequence of groups of letter selected without having to select each individual letter.

4 Claims, 2 Drawing Sheets

FIRST LEVEL
(NO PRESS, MOVE ONLY)

SECOND LEVEL
(PRESS DOWN + MOVE SPACE = PRESS ONLY)

WRITING "HELLO MY FRIEND"

KEYPADS STYLE INPUT DEVICE FOR ELECTRICAL DEVICE

CROSS-REFERENCE

This is related to U.S. patent application Ser. No. 09/703,021 filed Oct. 31, 2000 entitled "Keypads for Electrical Devices", which is incorporated herein by reference.

BACKGROUND

This invention relates to electrical systems and, more specifically, to keypads for mobile communication devices.

Manufactures are continuously developing mobile communication devices that are smaller and smaller. Accordingly, there is a need to minimize the size of these keypads. This is particularly the case given that it is becoming desirable to have as large a display as possible given the current trend of using such devices for retrieving data and graphical information from the Internet.

For such small keypads, an important factor is the ease with which the keypad may be used by a user and the size of the footprint on the surface of the device. Keypads for mobile telephones generally have a, basic, configuration as shown in FIG. 1. Keys which are used in dialing numbers, as well as for other purposes, are typically provided in a 4 by 3 matrix having a first row of numerals "1", "2", and "3", a second row of numerals "4", "5", and "6", a third row of numerals "7", "8", and "9" and a fourth row having a first character/function key, numeral "0", and a second character/function key.

One approach that manufacturers have taken is to reduce the size of each of the individual keys in the keypad, thereby reducing the size or the overall footprint of the keypad. However, there is a limit to the reduction in the size of the keypad. If the keypad is made too small, then it is difficult for the user to press the desired key without also accidentally pressing the neighboring keys.

Another arrangement of keys, which is usually located above this arrangement, is used to carry out other functions, such as initiating and terminating telephone calls and navigating around the screen and various menus of the mobile telephone.

One disadvantage is that typical keypads take up a larger surface area of the device.

Therefore, what is needed is a keypad that is compact with a relatively small footprint.

SUMMARY

A keypad device is provided that is relatively compact and can be used easily by the user. A mobile telephone includes a body, a display, and a keypad. The keypad is removably secured to the body and coupled to a processor. The keypad is depressible along a plurality of directions and can be switched between a first mode and second mode, wherein each combination of depressible direction and mode represent a unique group of alphanumeric letters. The processor includes word recognition software, such a desire word can be determined form the sequence of groups of letter selected without having to select each individual letter.

DETAILED DESCRIPTION

Figure 1:
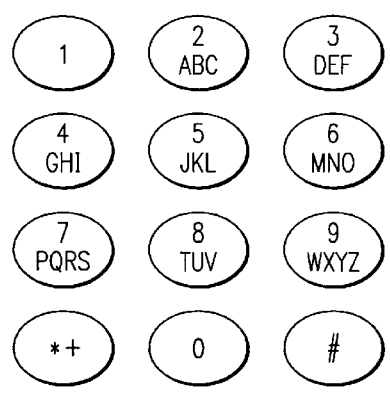
FIG. 1 shows a prior art keypad.
Figure 2:
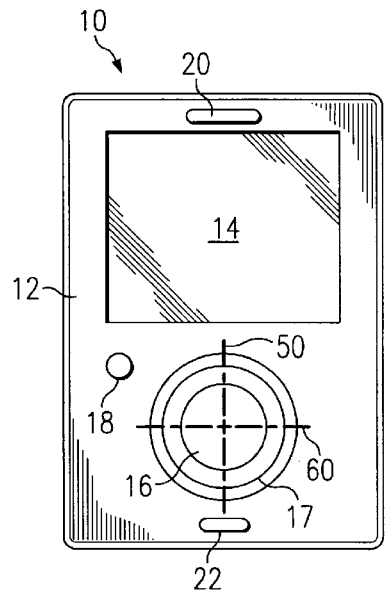
FIG. 2 shows a mobile terminal having a keypad in according to the present invention.

Referring now to FIG. 2 a mobile terminal 10 includes a body 12, a display 14, a keypad 16, an on/off button 18, a speaker 20, and a microphone 22. The display 14 has a non-unity aspect ratio.

In one embodiment, the keypad 16 is fixed relative to the body and in another embodiment the keypad 16 can be moved relative to the body 12 by a motor drive or manually. Additionally, the keypad 16 may be removable.

The keypad 16 is a depressible keypad with sensors located under the keypad 16, each sensor being positioned 90 degrees apart along the vertical and horizontal axis 50 and 60, respectively. Additionally, the keypad 16 includes a centrally located sensor. The central sensor is activated when the keypad 16 is pressed directly downward and allows the keypad 16 to toggle between a first mode and second mode.

The numeral keys 1 to 9 and 0 can be provided as a part of the keypad 16 or adjacent to the keypad 16 one another circular ring in a circular arrangement, such that neighboring numeral keys are in numerical order, or in a matrix type arrangement. The numeral keys can be arranged in an annulus, and the annulus may be rotated. In the embodiment with the annulus and the keypad 16, the annulus and the keypad 16 may be keyed together.

Figure 3:
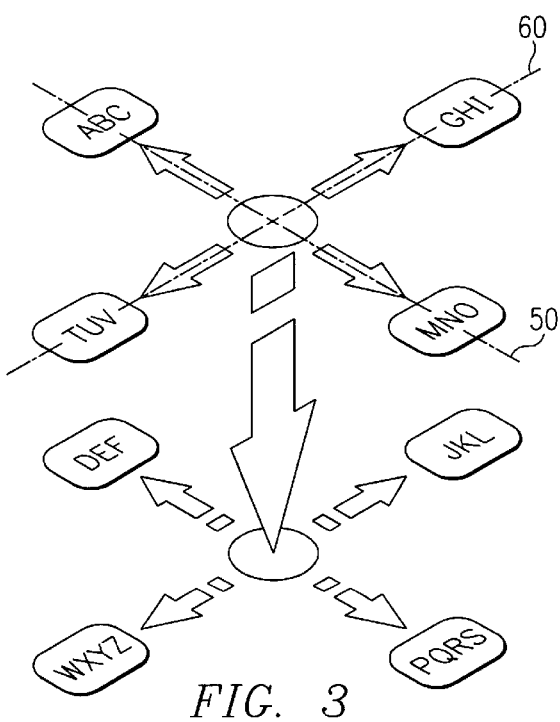
FIG. 3 is an exploded view of the functions of the keypad of FIG. 2.

Referring now to FIG. 3, the keypad 16 can be used to select alpha-letter. The letters are divided into eight groups. For example, the letters "a", "b", and "c" are located in the first position of the first mode along the axis 50. The letters "d", "e", and "f" are located in the first position of the second mode along the axis 50. The keypad 16 is switched from the first mode to the second mode by pressing the keypad 16 vertically. The selection of letters applies to selecting any desired letter.

The keypad 16, as indicated above, is located above a plurality of sensors. Thus, as the keypad 16 is pressed in any direction, the sensors can determine the desired direction and, hence, the corresponding groups of letters depending on the mode of the keypad 16.

The sensors located under the keypad 16 are coupled to internal circuitry. The circuitry includes a processor having word recognition software such that when a certain sequence of letters are entered the processor is able to determine the intended word and complete the action. Thus, if the letter "c" is the desired first selection, then the user would select the first mode and then press in the upper portion of the keypad 16 along the axis 50. The user would not be required to press the key pad three times as with typical prior art devices, in order to toggle through the letter "a" and "b" to get to the letter "c" and select that letter. As other groups of letters are selected, the processor can determine, based on the other letters, that the letter "c" was the intended letter for first selection.

The mobile terminal 10 is provided with locking means that locks out the keypad 16, such that pressing the keypad 16 or any of the other input keys does not result in a selection.

Figure 4:
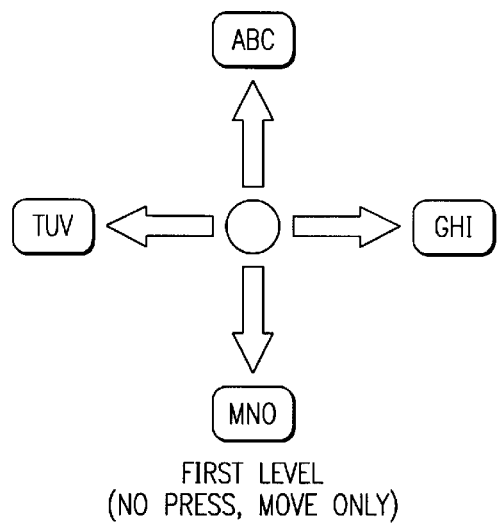
FIG. 4 is plan view of the functions of the keypad of FIG. 2 in a first mode.
Figure 5:
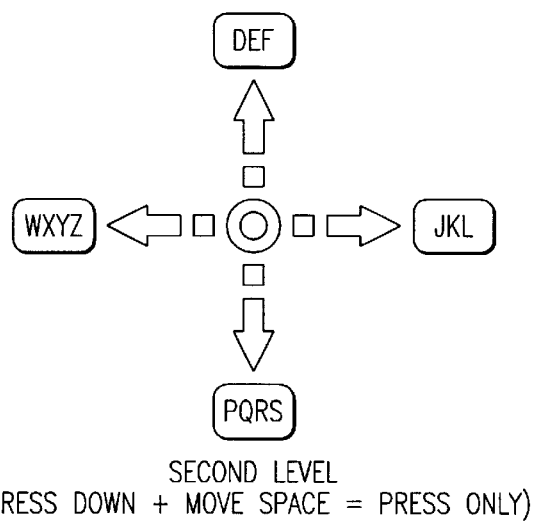
FIG. 5 is plan view of the functions of the keypad of FIG. 3.

Referring now to FIGS. 4 and 5, the grouping of the letters in the first mode and the grouping of the letters in the second mode are shown along with the process of switching between the modes.

Figure 6:
FIG. 6 is the keying sequence for entering a desired phrase.

Referring now to FIG. 6, the sequence needed to write the phrase "HELLO MY FRIEND" is set forth based on the legend shown in FIGS. 4 and 5. As evident from the sequence of entries, only the group of letters needs to be selected because the processor is capable of determining the intended word based on the selected sequence of groups.

Although reference is made to key-presses and pressing of keys, it is to be understood that an electrical device according to the invention may receive input by pressing of keys or by some other means. Furthermore, the foregoing description relates to a mobile terminal such as a mobile telephone, and it is understood that the invention can be applied to other devices such as computers, personal digital assistants, and entry terminals for inputting data or access codes, for example to gain access to a building or to another secure location.

Particular implementations and embodiments of the invention have been described. It is clear to a person skilled in the art that the invention is not restricted to details of the embodiments presented above, but that it can be implemented in other embodiments using equivalent means without deviating from the characteristics of the invention.

What is claimed is:

1. An electrical device comprising:

a body for retaining a control processor;

a display secured to the body coupled to the processor for visual presentation of information; and a keypad removably secured to the body and coupled to the processor, wherein the keypad is depressible along a plurality of directions and can be switched between a first mode and second mode and wherein each combination of depressible direction and mode represent a unique group of alphanumeric letters by selecting a letter in the first mode using lateral movement only of the keypad and selecting a letter in the second mode by a vertical pressing of the keypad and then a lateral movement of the keypad.

2. The electrical device according to claim 1, further comprising a annulus of numerical keys.

3. The electrical device according to claim 2, further comprising means for text recognition controlled by and coupled to the processor for determining, based on sequence of the unique groups selected, a unique word selected from a plurality of words.

4. The electrical device according to claim 3, wherein the keypad can be reposition in an orientation that is vertical relative to the orientation of the display.

\* \* \* \* \*